(12) United States Patent
Panda et al.

(10) Patent No.: US 11,954,910 B2
(45) Date of Patent: Apr. 9, 2024

(54) DYNAMIC MULTI-RESOLUTION PROCESSING FOR VIDEO CLASSIFICATION

(71) Applicants: International Business Machines Corporation, Armonk, NY (US); Massachusetts Institute of Technology, Cambridge, MA (US)

(72) Inventors: Rameswar Panda, Medford, MA (US); Yue Meng, Cambridge, MA (US); Chung-Ching Lin, White Plains, NY (US); Rogerio Schmidt Feris, West Hartford, CT (US); Aude Jeanne Oliva, Cambridge, MA (US)

(73) Assignees: International Business Machines Corporation, Armonk, NY (US); MASSACHUSETTS INSTITUTE OF TECHNOLOGY, MA, Cambridge, MA (US)

( * ) Notice: Subject to any disclaimer, the term of this patent is extended or adjusted under 35 U.S.C. 154(b) by 475 days.

(21) Appl. No.: 17/134,315

(22) Filed: Dec. 26, 2020

(65) Prior Publication Data

US 2022/0215198 A1 Jul. 7, 2022

(51) Int. Cl.
*G06V 20/40* (2022.01)
*G06F 18/21* (2023.01)
(Continued)

(52) U.S. Cl.
CPC ............ *G06V 20/41* (2022.01); *G06F 18/217* (2023.01); *G06N 3/04* (2013.01); *G06N 3/08* (2013.01); *G06T 3/40* (2013.01); *G06V 20/44* (2022.01)

(58) Field of Classification Search
CPC ........ G06F 18/217; G06N 3/04; G06N 3/044; G06N 3/045; G06N 3/08; G06N 3/084;
(Continued)

(56) References Cited

U.S. PATENT DOCUMENTS 8,861,784 B2   10/2014  Tojo
9,786,036 B2   10/2017  Annapureddy
(Continued)

FOREIGN PATENT DOCUMENTS

CN   107046639 B   8/2017
CN   108184117 A   6/2018
(Continued)

OTHER PUBLICATIONS

Peter Mell and Timothy Grance, The NIST Definition of Cloud Computing, NIST Special Publication 800-145, Sep. 2011, cover, pages i-iii and 1-3.
(Continued)

*Primary Examiner* — Zhiyu Lu
(74) *Attorney, Agent, or Firm* — Caleb Wilkes; Otterstedt & Kammer PLLC

(57) ABSTRACT

Methods, apparatus, and systems for multi-resolution processing for video classification. A plurality of video frames of a video are obtained and a resolution for classifying each video frame of the plurality of video frames is determined by analyzing each video frame using a policy network. Based on the determined resolution, each video frame having a determined resolution is rescaled and each rescaled video frame is routed to a classifier of a backbone network that corresponds to the determined resolution. Each rescaled video frame is classified using the corresponding classifier of the backbone network to obtain a plurality of classifications and the classifications are averaged to determine an action classification of the video.

21 Claims, 5 Drawing Sheets

(51) Int. Cl.
 *G06N 3/04* (2023.01)
 *G06N 3/08* (2023.01)
 *G06T 3/40* (2006.01)
(58) Field of Classification Search
 CPC .......... G06N 7/01; G06T 3/40; G06T 3/4092; G06V 10/82; G06V 20/41; G06V 20/44
 See application file for complete search history.

(56) References Cited

U.S. PATENT DOCUMENTS

| | | | |
|---|---|---|---|
| 9,992,500 B2 | 6/2018 | Choi et al. | |
| 11,772,259 B1* | 10/2023 | Kiehl | B25J 9/163 700/245 |
| 2018/0114071 A1 | 4/2018 | Wang | |
| 2021/0081673 A1* | 3/2021 | Lai | G06V 20/41 |

FOREIGN PATENT DOCUMENTS

| | | | |
|---|---|---|---|
| CN | 109286812 B | 1/2019 | |
| CN | 109660812 A | 4/2019 | |
| CN | 110611809 A | 12/2019 | |
| CN | 110852944 A | 2/2020 | |
| CN | 111163351 A | 5/2020 | |
| WO | WO2019209007 | * 10/2019 | G06N 3/08 |

OTHER PUBLICATIONS

Carreira, J., Zisserman, A.: Quo vadis, action recognition? a new model and the kinetics dataset. In: proceedings of the IEEE Conference on Computer Vision and Pattern Recognition. pp. 6299-6308 (2017).
Monfort, M., Andonian, A., Zhou, B., Ramakrishnan, K., Bargal, S.A., Yan, T., Brown, L., Fan, Q., Gutfreund, D., Vondrick, C., et al.: Moments in time dataset: one million videos for event understanding. IEEE transactions on pattern analysis and machine intelligence 42(2), 502-508 (2019).
Laptev, I., Marszalek, M., Schmid, C., Rozenfeld, B.: Learning realistic human actions from movies. In: 2008 IEEE Conference on Computer Vision and Pattern Recognition. pp. 1-8. IEEE (2008).
Karpathy, A., Toderici, G., Shetty, S., Leung, T., Sukthankar, R., Fei-Fei, L.: Largescale video classication with convolutional neural networks. In: Proceedings of the IEEE conference on Computer Vision and Pattern Recognition. pp. 1725-1732 (2014).
Tran, D., Bourdev, L., Fergus, R., Torresani, L., Paluri, M.: Learning spatiotemporal features with 3d convolutional networks. In: Proceedings of the IEEE international conference on computer vision. pp. 4489-4497 (2015).
Wang, L., Xiong, Y., Wang, Z., Qiao, Y., Lin, D., Tang, X., Van Gool, L.: Temporal segment networks: Towards good practices for deep action recognition. In: European conference on computer vision. pp. 20-36. Springer (2016).
Zhou, B., Andonian, A., Oliva, A., Torralba, A.: Temporal relational reasoning in videos. In: Proceedings of the European Conference on Computer Vision (ECCV). pp. 803-818 (2018).
Lin, J., Gan, C., Han, S.: Tsm: Temporal shift module for efficient video understanding. In: Proceedings of the IEEE International Conference on Computer Vision. pp. 7083-7093 (2019).
Wang, X., Girshick, R., Gupta, A., He, K.: Non-local neural networks. In: Proceedings of the IEEE conference on computer vision and pattern recognition. pp. 7794-7803 (2018).
Donahue, J., Anne Hendricks, L., Guadarrama, S., Rohrbach, M., Venugopalan, S., Saenko, K., Darrell, T.: Long-term recurrent convolutional networks for visual recognition and description. In: Proceedings of the IEEE conference on computer vision and pattern recognition. pp. 2625-2634 (2015).
Hara, K., Kataoka, H., Satoh, Y.: Can spatiotemporal 3d cnns retrace the history of 2d cnns and imagenet? In: Proceedings of the IEEE conference on Computer Vision and Pattern Recognition. pp. 6546-6555 (2018).

Wu, Z., Xiong, C., Ma, C.Y., Socher, R., Davis, L.S.: Adaframe: Adaptive frame selection for fast video recognition. In: Proceedings of the IEEE Conference on Computer Vision and Pattern Recognition. pp. 1278-1287 (2019).
Tran, D., Wang, H., Torresani, L., Ray, J., LeCun, Y., Paluri, M.: A closer look at spatiotemporal convolutions for action recognition. In: Proceedings of the IEEE conference on Computer Vision and Pattern Recognition. pp. 6450-6459 (2018).
Piergiovanni, A., Angelova, A., Ryoo, M.S.: Tiny video networks. arXiv preprintarXiv:1910.06961 (2019) (19 pages).
Yeung, S., Russakovsky, O., Mori, G., Fei-Fei, L.: End-to-end learning of action detection from frame glimpses in videos. In: Proceedings of the IEEE Conference on Computer Vision and Pattern Recognition. pp. 2678-2687 (2016).
Wu, W., He, D., Tan, X., Chen, S., Wen, S.: Multi-agent reinforcement learning based frame sampling for effective untrimmed video recognition. In: Proceedingsof the IEEE International Conference on Computer Vision. pp. 6222-6231 (2019).
Korbar, B., Tran, D., Torresani, L.: Scsampler: Sampling salient clips from video for efficient action recognition. In: Proceedings of the IEEE International Conference on Computer Vision. pp. 6232-6242 (2019).
Wu, Z., Xiong, C., Jiang, Y.G., Davis, L.S.: Liteeval: A coarse-to-fine framework for resource efficient video recognition. In: Advances in Neural Information Processing Systems. pp. 7778-7787 (2019).
Bengio, E., Bacon, P.L., Pineau, J., Precup, D.: Conditional computation in neural networks for faster models. arXiv preprint arXiv:1511.06297 (2015) (12 pages.).
Wu, Z., Nagarajan, T., Kumar, A., Rennie, S., Davis, L.S., Grauman, K., Feris,R.: Blockdrop: Dynamic inference paths in residual networks. In: Proceedings of the IEEE Conference on Computer Vision and Pattern Recognition. pp. 8817-8826 (2018).
Figurnov, M., Collins, M.D., Zhu, Y., Zhang, L., Huang, J., Vetrov, D., Salakhutdinov, R.: Spatially adaptive computation time for residual networks. In: Proceedings of the IEEE Conference on Computer Vision and Pattern Recognition. pp. 1039-1048 (2017).
Graves, A.: Adaptive computation time for recurrent neural networks. arXiv preprint arXiv:1603.08983 (2016) (19 pages.).
Guo, Y., Shi, H., Kumar, A., Grauman, K., Rosing, T., Feris, R.: Spottune: transfer earning through adaptive fine-tuning. In: Proceedings of the IEEE Conference on Computer Vision and Pattern Recognition. pp. 4805-4814 (2019).
Najibi, M., Singh, B., Davis, L.S.: Autofocus: Efficient multi-scale inference. In: Proceedings of the IEEE International Conference on Computer Vision. pp. 9745-9755 (2019).
Adelson, E.H., Anderson, C.H., Bergen, J.R., Burt, P.J., Ogden, J.M.: Pyramid methods in image processing. RCA engineer 29(6), 33-41 (1984).
Perona, P., Malik, J.: Scale-space and edge detection using anisotropic diffusion. IEEE Transactions on pattern analysis and machine intelligence 12(7), 629-639 (1990).
Pedersoli, M., Vedaldi, A., Gonzalez, J., Roca, X.: A coarse-to-fine approach for fast deformable object detection. Pattern Recognition 48(5), 1844-1853 (2015).
Cai, Z., Fan, Q., Feris, R.S., Vasconcelos, N.: A unified multi-scale deep convolutional neural network for fast object detection. In: European conference on computer vision. pp. 354-370. Springer (2016).
Lin, T.Y., Dollar, P., Girshick, R., He, K., Hariharan, B., Belongie, S.: Feature pyramid networks for object detection. In: Proceedings of the IEEE conference on computer vision and pattern recognition. pp. 2117-2125 (2017).
Chen, C.F., Fan, Q., Mallinar, N., Sercu, T., Feris, R.: Big-little net: An efficient multi-scale feature representation for visual and speech recognition. arXiv preprint arXiv:1807.03848 (2018) (20 pages.).
Feichtenhofer, C., Fan, H., Malik, J., He, K.: Slowfast networks for video recognition. In: Proceedings of the IEEE International Conference on Computer Vision. pp. 6202-6211 (2019).
Blanco-Justicia et al., Machine learning explainability via microaggregation and shallow decision trees. Knowledge-Based Systems. Jan. 24, 2020:105532. 33 Pages.

(56) References Cited

OTHER PUBLICATIONS

Sandler, Mark, et al. "Mobilenetv2: Inverted residuals and linear bottlenecks." Proceedings of the IEEE conference on computer vision and pattern recognition. 2018. 14 Pages.
Yue Meng, Chung-Ching Lin, Rameswar Panda, Prasanna Sattigeri, Leonid Karlinsky, Aude Oliva, Kate Saenko, and Rogerio Feris, 2020, August. Ar-net: Adaptive frame resolution for efficient action recognition. In European Conference on Computer Vision. Springer, Cham. arXiv preprint arXiv:2007.15796. Jul. 31, 2020. (25 pages.) (Grace Period Disclosure).
Araujo, A., Negrevergne, B., Chevaleyre, Y., Atif, J.: Training compact deep learning models for video classification using circulant matrices. ECCV, 2018. (15 pages.).
Dong, X., Huang, J., Yang, Y., Yan, S.: More is less: A more complicated network with less inference complexity. CVPR, pp. 5840-5848. 2017.
Chen, W., Wilson, J., Tyree, S., Weinberger, K., Chen, Y.: Compressing neural networks with the hashing trick. ICML, 2015. (10 pages.).
Gao, R., Oh, T.H., Grauman, K., Torresani, L.: Listen to look: Action recognition by previewing audio. In: Proceedings of the IEEE/CVF Conference on Computer Vision and Pattern Recognition. pp. 10457-10467 (2020).
Fan, Q., Chen, C.F.R., Kuehne, H., Pistoia, M., Cox, D.: More is less: Learning efficient video representations by big-little network and depthwise temporal aggregation. In: Advances in Neural Information Processing Systems. (2019) (10 pages.).
Fan, H., Xu, Z., Zhu, L., Yan, C., Ge, J., Yang, Y.: Watching a small portion could be as good as watching all: Towards efficient video classification. In: IJCAI International Joint Conference on Artificial Intelligence pp. 705-711. (2018).
Yue-Hei Ng, J., Hausknecht, M., Vijayanarasimhan, S., Vinyals, O., Monga, R. and Toderici, G., 2015. Beyond short snippets: Deep networks for video classification. In Proceedings of the IEEE conference on computer vision and pattern recognition (pp. 4694-4702).
Simonyan, K. and Zisserman, A., 2014. Two-stream convolutional networks for action recognition in videos. In Advances in neural information processing systems (9 pages).
Ji, S., Xu, W., Yang, M. and Yu, K., 2012. 3D convolutional neural networks for human action recognition. IEEE transactions on pattern analysis and machine intelligence, 35(1). (8 pages.).
Wu, Zuxuan, et al. "Liteeval: A coarse-to-fine framework for resource efficient video recognition." Advances in Neural Information Processing Systems. 2019. 10 Pages.
Yue Meng, Chung-Ching Lin, Rameswar Panda, Prasanna Sattigeri, Leonid Karlinsky, Aude Oliva, Kate Saenko, and Rogerio Feris, 2020, August. Ar-net: Adaptive frame resolution for efficient action recognition. In European Conference on Computer Vision (pp. 86-104). Springer, Cham. arXiv preprint arXiv:2007.15796. Jul. 31, 2020. (Grace Period Disclosure).

\* cited by examiner

DYNAMIC MULTI-RESOLUTION PROCESSING FOR VIDEO CLASSIFICATION

STATEMENT REGARDING PRIOR DISCLOSURES BY THE INVENTOR OR A JOINT INVENTOR

The following disclosure(s) are submitted under 35 U.S.C. 102(b)(1)(A): Yue Meng, Chung-Ching Lin, Rameswar Panda, Prasanna Sattigeri, Leonid Karlinsky, Aude Oliva, Kate Saenko, and Rogerio Feris, 2020, August. Ar-net: Adaptive frame resolution for efficient action recognition. In *European Conference on Computer Vision* (pp. 86-104). Springer, Cham. arXiv preprint arXiv:2007.15796. 2020 Jul. 31.

BACKGROUND

The present invention relates to the electrical, electronic and computer arts, and more specifically, to the classification of videos using artificial intelligence (AI).

Action recognition has attracted intense attention in recent years, and is an open and challenging problem in computer vision. While current state-of-the-art models offer excellent recognition results, their computational expense limits their impact for many real-world applications. Much progress has been made in developing a variety of ways to recognize complex actions, by either applying 2D-CNNs (two-dimensional convolutional neural networks) with additional temporal modeling or 3D-CNNs (three-dimensional convolutional neural networks) that model the space and time dimensions jointly. Despite impressive results on commonly used benchmark datasets, the accuracy obtained by most of these models usually grows proportionally with their complexity and computational cost. This poses an issue for deploying these models in many resource-limited applications such as autonomous vehicles and mobile platforms.

SUMMARY

Principles of the invention provide techniques for dynamic multi-resolution processing for video classification. In one aspect, an exemplary method includes the operations of obtaining a plurality of video frames of a video; determining a resolution for classifying each video frame of the plurality of video frames by analyzing each video frame using a policy network; rescaling, based on the determined resolution, each video frame having a determined resolution; routing each rescaled video frame to a classifier of a backbone network that corresponds to the determined resolution; classifying each rescaled video frame using the corresponding classifier of the backbone network to obtain a plurality of classifications; and averaging the classifications to determine an action classification of the video.

In one aspect, a non-transitory computer readable medium comprises computer executable instructions which when executed by a computer cause the computer to perform the method of: obtaining a plurality of video frames of a video; determining a resolution for classifying each video frame of the plurality of video frames by analyzing each video frame using a policy network; rescaling, based on the determined resolution, each video frame having a determined resolution; routing each rescaled video frame to a classifier of a backbone network that corresponds to the determined resolution; classifying each rescaled video frame using the corresponding classifier of the backbone network to obtain a plurality of classifications; and averaging the classifications to determine an action classification of the video.

In one aspect, an apparatus comprises a memory; and at least one processor, coupled to said memory, and operative to perform operations comprising obtaining a plurality of video frames of a video; determining a resolution for classifying each video frame of the plurality of video frames by analyzing each video frame using a policy network; rescaling, based on the determined resolution, each video frame having a determined resolution; routing each rescaled video frame to a classifier of a backbone network that corresponds to the determined resolution; classifying each rescaled video frame using the corresponding classifier of the backbone network to obtain a plurality of classifications; and averaging the classifications to determine an action classification of the video.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

- automatic determination of image resolutions for performing efficient action recognition in a video;
- significant savings in floating point operations per second (FLOPS) (e.g., about 45% less computation over state-of-the-art methods);
- consistent improvement in action recognition accuracy; and
- a policy network jointly trained with a recognition model using backpropagation through Gumbel Softmax sampling to determine the image resolution.

These and other features and advantages of the present invention will become apparent from the following detailed description of illustrative embodiments thereof, which is to be read in connection with the accompanying drawings.

DETAILED DESCRIPTION

Figure 1:
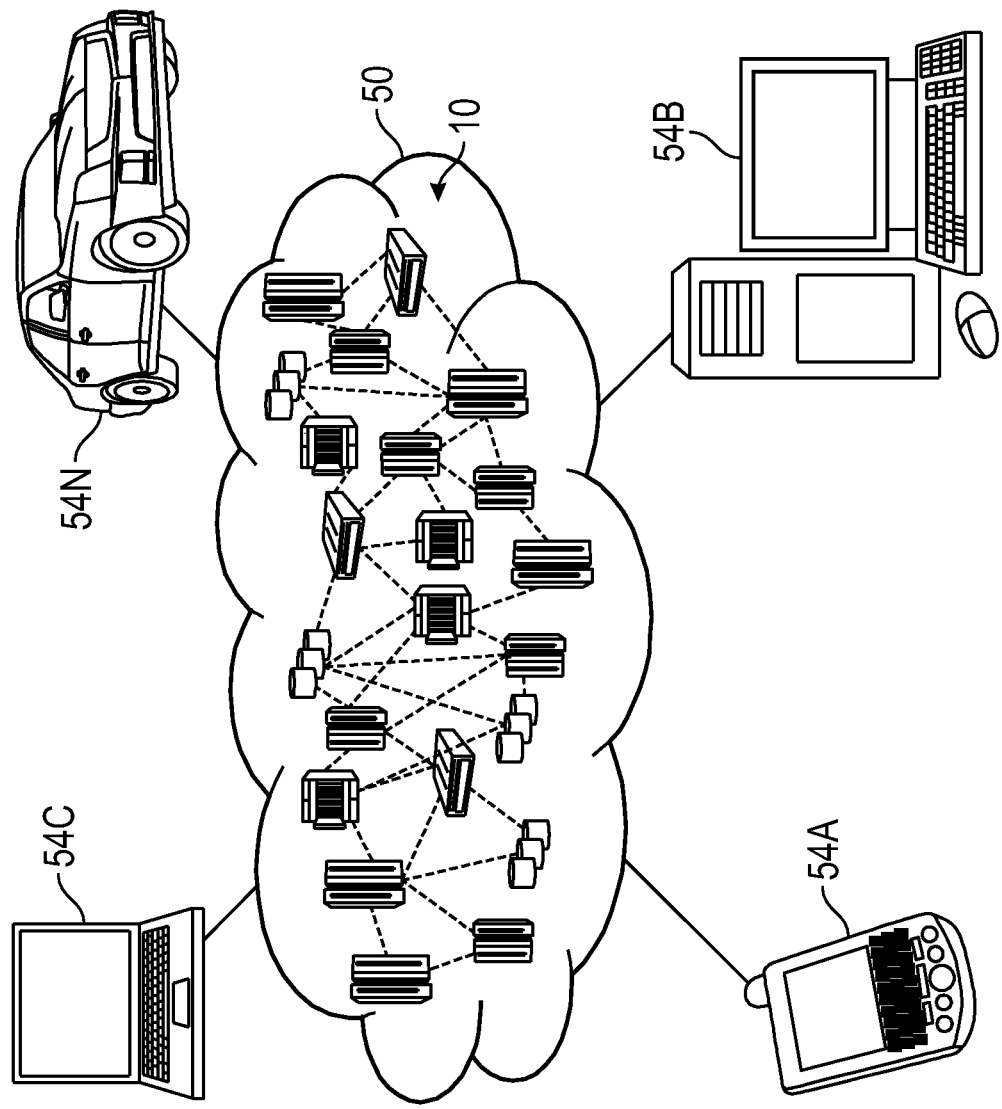
FIG. 1 depicts a cloud computing environment according to an embodiment of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
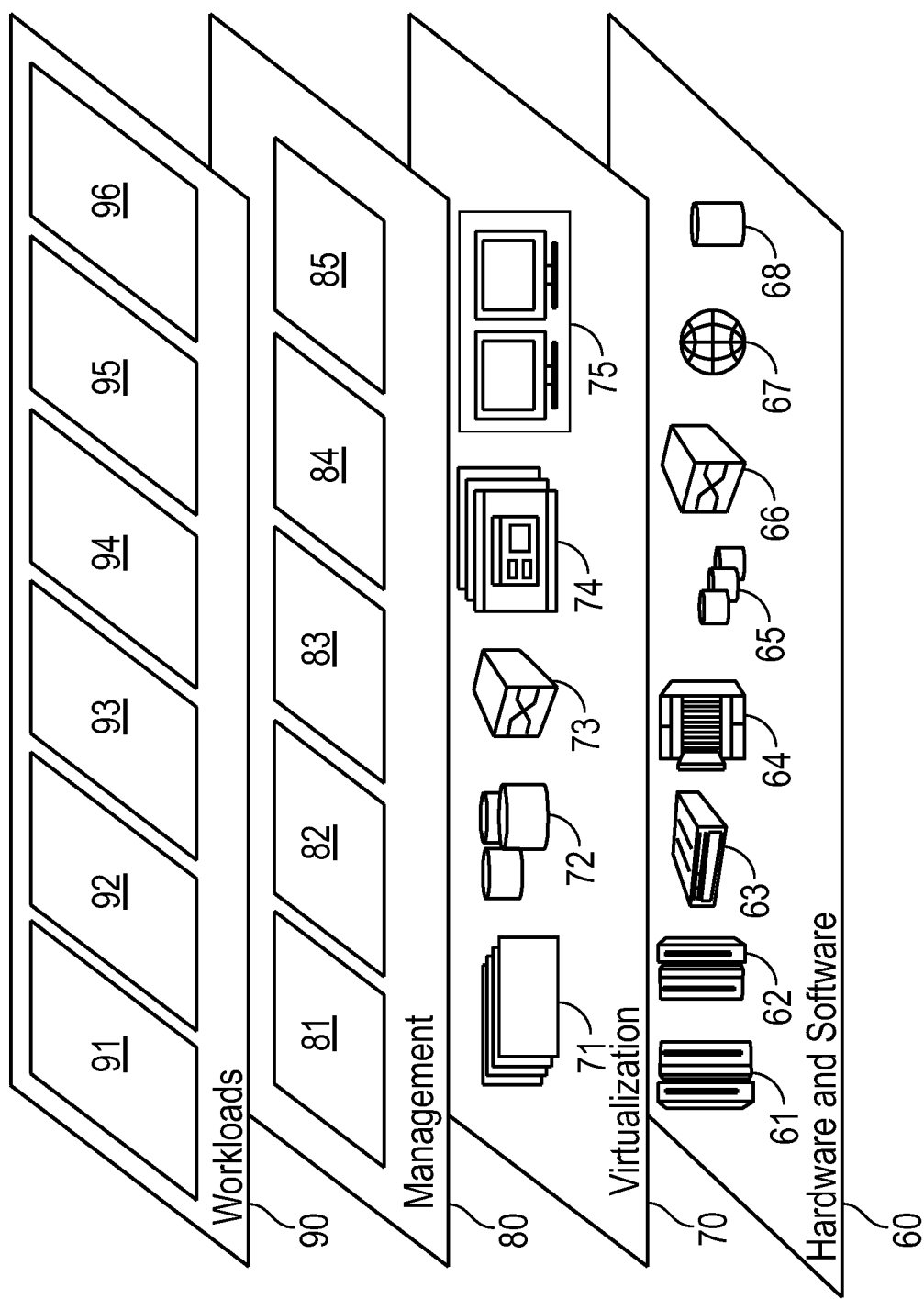
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a cloud-based system for dynamic multi-resolution processing for video classification 96.

Generally, exemplary techniques (a non-limiting exemplary embodiment is referred to as the Adaptive Resolution Network (AR-Net) system herein) select the optimal resolution for each frame of a video conditioned on the input for efficient action recognition in, for example, long untrimmed videos. Specifically, given a video frame, a policy network is used to decide the input resolution used for processing with an action recognition model, with the goal of improving accuracy and efficiency. In one example embodiment, the selection is performed on-the-fly.

In one example embodiment, the policy network is jointly trained with the recognition model using standard backpropagation.

Figure 3:
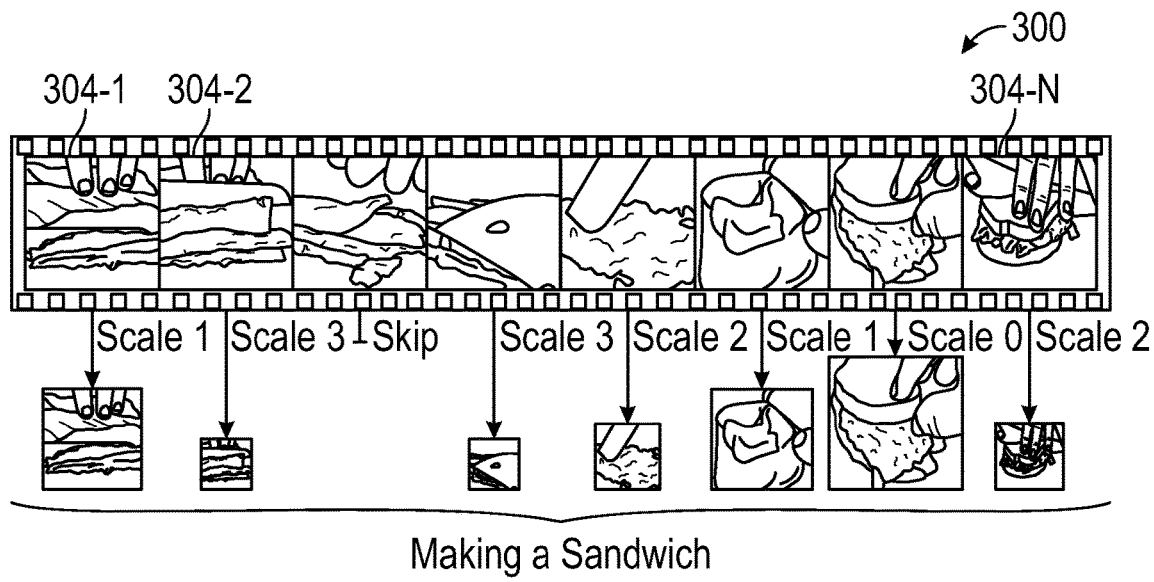
FIG. 3 is a representation of a video where the representation consists of eight uniformly sampled frames, in accordance with an example embodiment.

Extensive studies have been conducted for designing compact architectures and compressing models. Most of the existing methods process all the frames in a given video at the same resolution. In particular, orthogonal to the design of compact models, the computational cost of a CNN model has much to do with the input frame size. FIG. 3 is a representation 300 of a video where the representation consists of eight uniformly sampled frames 304-1, 304-2, . . . , 304-N, in accordance with an example embodiment.

Conventionally, the sampled frames are processed at the same resolution. The disclosed techniques enable the recognition of the action in the video as "making a sandwich" by processing the frames at different resolutions. For example, the seventh frame is the most useful frame for recognition; therefore, only this frame is processed at the highest resolution (Scale 0), while the rest of the frames are processed at lower resolutions (such as Scales 1-3) or even skipped (i.e., the resolution set to zero) without losing any accuracy, resulting in large computational savings compared to processing all the frames with the same resolution (for example, 224×224). Thus, in contrast to the commonly used one-size-fits-all scheme, the resolution decision is made individually per input frame, leading to different amounts of computation for different videos.

In one example embodiment, AR-Net uses machine learning to learn a decision policy that selects an optimal or near optimal frame resolution conditioned on inputs for efficient action recognition. The policy is sampled from a discrete distribution parameterized by the output of a lightweight neural network (referred to as the policy network herein), which decides, on-the-fly, the input resolution to be used on a per video/image frame basis. As these decision functions are discrete and non-differentiable, a Gumbel Softmax sampling approach is used to jointly learn the policy with the network parameters through standard backpropagation, without resorting to complex reinforcement learning. The loss is designed to achieve both the competitive performance and resource efficiency satisfactory for action recognition. Adaptively selecting the frame resolution by a lightweight policy network yields not only significant savings in floating point operations per second (FLOPS) (e.g., about 45% less computation over state-of-the-art methods), but also consistent improvement in action recognition accuracy.

Efficient Action Recognition

Action recognition has made progress with the introduction of a number of large-scale datasets. Early methods have studied action recognition using shallow classification models, such as support vector machine (SVM) on top of local visual features extracted from a video. In the context of deep neural networks, it is typically performed by either 2D-CNNs or 3D-CNNs. A straightforward but popular approach is the use of 2D-CNNs to extract frame-level features and then model the temporal causality across frames using different aggregation modules, such as temporal averaging in temporal segment networks (TSN), a bag of features scheme in temporal relation networks (TRN), channel shifting in temporal shift module (TSM), depthwise convolutions in technology acceptance model (TAM), non-local neural networks, and long short-term memory (LSTMs). Many variants of 3D-CNNs, such as convolutional 3D (C3D), inflated 3D (I3D) and 3D Residual Network (ResNet3D), that use 3D convolutions to model space and time jointly, have also been introduced for action recognition.

While extensive studies have been conducted, limited efforts have been made towards efficient action recognition. Specifically, methods for efficient recognition focus on either designing new lightweight architectures (e.g., R(2+1) D, Tiny Video Networks, channel-separated CNNs) or selecting salient frames/clips conditioned on the input. The disclosed approach focuses on adaptive data sampling and is agnostic to the network architecture used for recognizing actions.

Representative methods typically use Reinforcement Learning (RL) where an agent or multiple agents are trained with policy gradient methods to select relevant video frames, without deciding frame resolution as in the disclosed approach. More recently, audio has also been used as an efficient way to select salient frames for action recognition. Unlike existing works, the disclosed framework requires neither complex RL policy gradients nor additional modalities such as audio. For example, known coarse-to-fine frameworks for resource efficient video recognition use a binary gate for selecting either coarse or fine features. In contrast to only the selection of binary input sizes, in one or more embodiments, both the selection of optimal frame resolutions and skipping in a unified framework are addressed, and the selection and recognition mechanisms are jointly learned in a fully differentiable manner. Moreover, unlike a binary sequential decision being made at every step in known coarse-to-fine frameworks for resource efficient video recognition, one or more embodiments have the flexibility in deciding multiple actions in a single step and also the scalability towards long untrimmed videos via multi-step skipping operations.

Adaptive Computation

Many adaptive computation methods have been proposed with the goal of improving computational efficiency. Several works have been proposed that add decision branches to different layers of CNNs to learn whether to exit the network for faster inference. One goal of one or more embodiments is to adaptively select optimal frame resolutions for efficient action recognition.

Multi-Resolution Processing

Multi-resolution feature representations have a long history in computer vision. Traditional methods include image pyramids, scale-space representations, and coarse-to-fine approaches. More recently, in the context of deep learning, multi-scale feature representations have been used for detection and recognition of objects at multiple scales, as well as to speed up deep neural networks. Advantageously, unlike certain prior art techniques that process video frames at multiple resolutions with specialized network branches, one or more embodiments determine optimal resolution for each frame, with the goal of improving accuracy and efficiency.

Given a video dataset $\mathcal{D}=\{(V_i, y_i)\}_{i=1}^{N}$, where each video $V_i$ contains frames with spatial resolution $3 \times H_0 \times W_0$ and is labelled from the predefined classes: $y_i \in \mathbb{Y}=\{0, 1, \ldots, C-1\}$, a goal is to create an adaptive selection strategy that decides, per input frame, which resolution to use for processing by the classifier $\mathcal{F}: \mathbb{V} \to \mathbb{Y}$ with the goal of improving accuracy and efficiency.

Figure 4A:
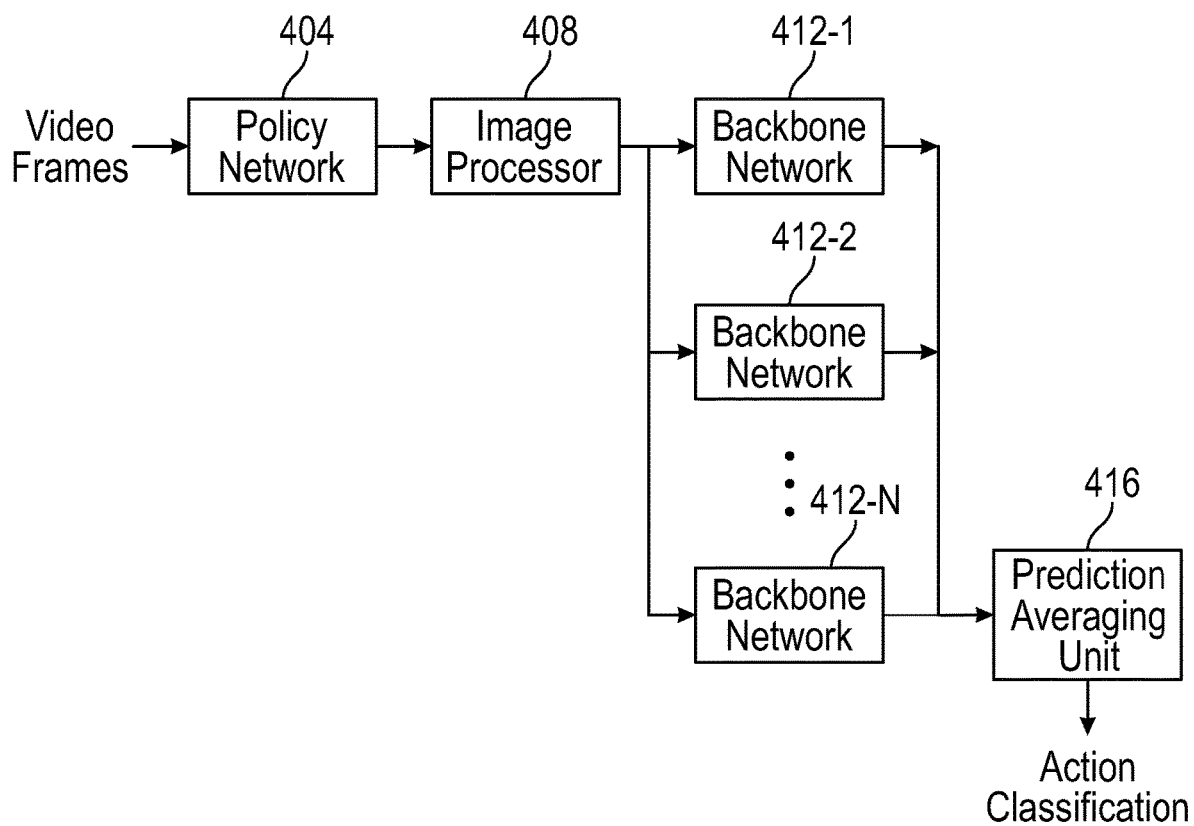
FIGS. 4A and 4B are a high-level block diagram and workflow of a classification system for classifying actions, in accordance with an example embodiment.

FIG. 4A is a high-level block diagram of a classification system for classifying actions, in accordance with an example embodiment. In one example embodiment, the exemplary AR-Net system includes a policy network 404 and different backbone networks 412-1, 412-2, . . . , 412-N corresponding to different resolutions.) The policy network 404 decides what resolution to use on a per frame basis (or whether to skip a given frame) to achieve a specified accuracy and efficiency. In training, policies are sampled from a Gumbel Softmax distribution, which allows optimization of the policy network 404 via backpropagation. During inference, input frames are first fed into the policy network 404 to decide the proper resolutions, then the frames are rescaled by an image processor 408 and the rescaled frames are routed to corresponding backbone networks 412-1, 412-2, . . . , 412-N to generate predictions. Finally, the network prediction averaging unit 416 averages all the predictions for action classification.

The exemplary policy network 404 includes a lightweight feature extractor and an LSTM module that decides what resolutions (or skipping) to use per input frame, for efficient action recognition. In one or more embodiments, different network sizes are adopted to handle different resolutions, as a frame with a higher resolution should be processed by a heavier network because of its capability to handle the detailed visual information and vice versa. Furthermore, it is often unnecessary and inefficient to process every frame in a video due to large redundancy coming from static scenes or the frame quality being very low (blur, low-light conditions, and the like). Thus, a skipping mechanism is designed in addition to the adaptive selection of frame resolutions in a unified framework to skip frames (i.e., resolution set to zero) whenever necessary to further improve the efficiency in action recognition.

During training, the policy network 404 is jointly trained with the recognition models using Gumbel Softmax sampling. At test time, an input frame is first fed into a policy network 404, whose output decides the proper resolutions, and then the resized frames are routed to the corresponding models to generate the predictions. Finally, the network averages all the predictions as the action classification result. Note that the additional computational cost is incurred by resizing operations and the policy network 404, which are negligible in comparison to the original recognition models (the policy network 404 is designed to be very lightweight, e.g., the well-known lightweight neural network MobileNetv2).

Figure 4B:
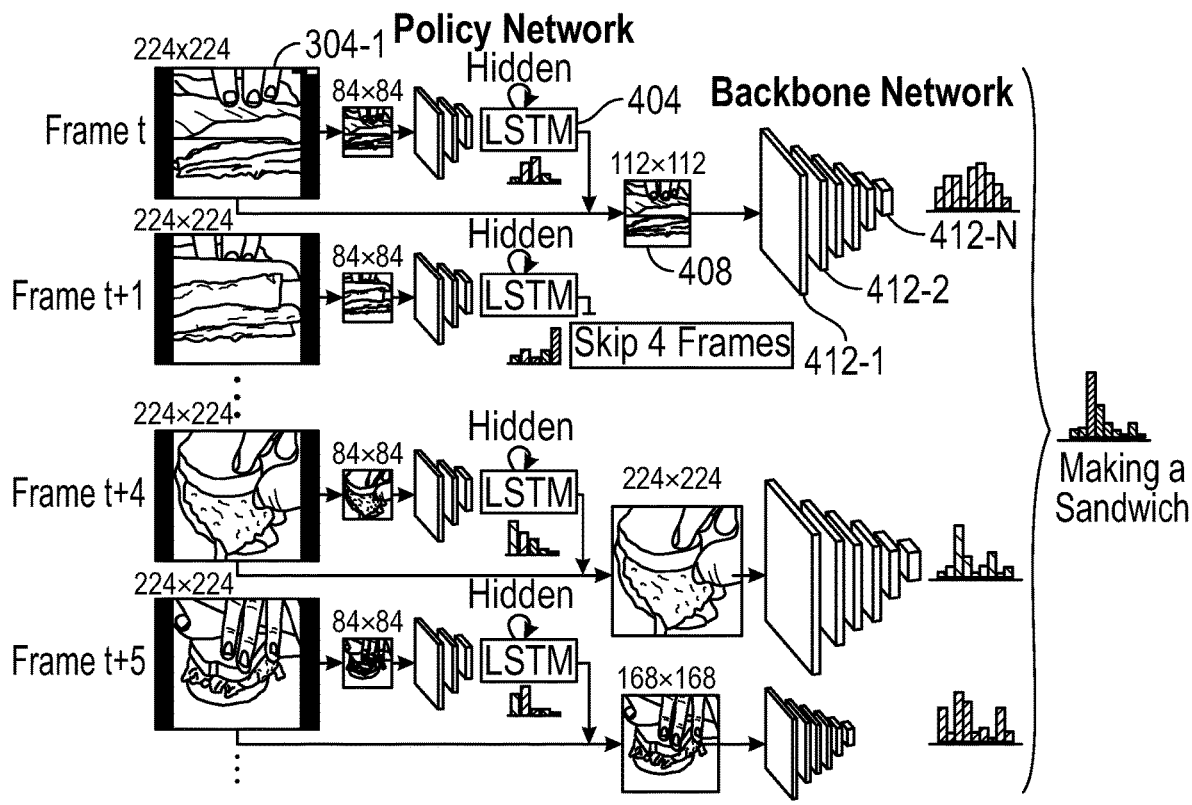

FIG. 4B is an example workflow for the classification system 400 of FIG. 4A, in accordance with an example embodiment. Video frames, such as video frame 304-1 of FIG. 3, are sequentially processed by the policy network 404. The frames which are not skipped are rescaled by the image processor 408 and routed to the appropriate backbone network 408 for prediction. The prediction averaging unit 416 averages all the predictions to generate the action classification of "making a sandwich."

Learning the Adaptive Resolution Policy

Adaptive Resolution

The exemplary AR-Net system adaptively chooses different frame scales to achieve efficiency. Denote a sequence of resolutions in descending order as $\{s_i\}_{i=0}^{L-1}$, where $s_0=(H_0, W_0)$ stands for the original (also the highest) frame resolution, and $s_{L-1}=(H_{L-1}, W_{L-1})$ is the lowest resolution. The frame at time $t$ in the $l^{th}$ scale (resolution $s_l=(H_l, W_l)$) is denoted as $I_t^l$. Skipping frames is considered a special case of "choosing resolutions $s_\infty$". The skippings sequence (ascending order) is defined as $\{F_i\}_{i=0}^{M-1}$, where the $i^{th}$ operation means to skip the current frame and the following ($F_i-1$) frames from predictions. The choices for resolutions and skippings formulate the action space $\Omega$.

Policy Network

The policy network 404 contains a lightweight feature extractor $\Phi(\cdot; \theta_\Phi)$ and an LSTM module. At time step $t<T$, the frame $I_t$ is resized to the lowest resolution $I_t^{L-1}$ (for efficiency) and it is sent to the feature extractor, $$f_t = \Phi(I_t^{L-1}; \theta_\Phi) \qquad (1)$$

where $f_t$ is a feature vector and $\theta_\Phi$ denotes learnable parameters ($\theta_{name}$ is used for the learnable parameters in the rest of this section). The LSTM updates hidden state $h_t$ and outputs $o_t$ using the extracted feature and previous states, $$h_t, o_t = \text{LSTM}(f_t, h_{t-1}, o_{t-1}; \theta_{LSTM}) \qquad (2)$$

Given the hidden state, the policy network 404 estimates the policy distribution and samples the action at $a_t \in \Omega = \{0, 1, \ldots L+M-1\}$ via the Gumbel Softmax operation (described below), $$a_t \sim \text{GUMBEL}(h_t, \theta_G) \qquad (3)$$

If $a_t < L$, the frame is resized to spatial resolution $3 \times H_{a_t} \times W_{a_t}$ and forwarded to the corresponding one of the backbone networks 412-1, 412-2, ..., $$412\text{-}N\ \psi_{a_t}(\cdot; \theta_{\psi_{a_t}})$$

to get a frame-level prediction, $$y_t^{a_t} = \psi_{a_t}(I_t^{a_t}; \theta_{\psi_{a_t}}) \qquad (4)$$

where $$I_t^{a_t} \in \mathbb{R}^{3 \times H_{a_t} \times W_{a_t}}$$

is the resized frame and $y_t^{a_t} \in \mathbb{R}^C$ is the prediction. Finally, all the frame-level predictions are averaged to generate the video-level prediction $y$ for the given video $V$.

When the action $a_t \geq L$, the backbone networks 412-1, 412-2, ..., 412-N will skip the current frame for prediction, and the following $(F_{a_t-L}-1)$ frames will be skipped by the policy network 404. Moreover, to save the computation, the policy network 404 is shared for generating both policy and predictions for the lowest resolution, i.e., $\Psi_{L-1} = \Phi$. (The notation here is for brevity. Actually, the output for $\Phi$ is a feature vector, whereas the output for $\Psi_{L-1}$ is a prediction. In one or more embodiments, a fully connected layer is used after the feature vector to get the prediction.) Furthermore in this regard, to save computation, in one or more embodiments, the policy network is shared for generating both policy and predictions for the lowest resolution. "Shared" here means the same neural network is used for both generating the policy and processing the lowest resolution. In other words, if the policy network is selecting the lowest resolution for a frame, then it will not be processed again as it is already processed by the policy network.

Training Using Gumbel Softmax Sampling

AR-Net makes decisions about which resolutions (or skipping) to use per training example. However, the fact that the decision policy is discrete makes the network non-differentiable and therefore difficult to optimize via back-propagation. One common practice is to use a score function estimator (e.g., REINFORCE) to avoid back-propagating through the discrete samples. However, due to the undesirable fact that the variance of the score function estimator scales linearly with the discrete variable dimension (even when a variance reduction method is adopted), it is slow to converge in many applications. As an alternative, a Gumbel-Softmax Sampling is adopted to resolve this non-differentiability and enable direct optimization of the discrete policy in an efficient way.

The Gumbel Softmax trick is a simple and effective way to substitute the original non-differentiable sample from a discrete distribution with a differentiable sample from a corresponding Gumbel-Softmax distribution. Specifically, at each time step t, the logits $z \in \mathbb{R}^{L+M-1}$ is first generated from hidden states $h_t$ by a fully-connected layer $z = FC(h_t, \theta_{FC})$. Then, use Softmax to generate a categorical distribution $\text{ret}$, $$\pi_t = \left\{ p_i \mid p_i = \frac{\exp(z_i)}{\sum_{j=0}^{L+M-1} \exp(z_j)} \right\} \qquad (5)$$

With the Gumbel-Max trick, the discrete samples from a categorical distribution are drawn as follows:

$$\hat{p} = \arg\max_i (\log p_i + G_i), \qquad (6)$$

where $G_i = -\log(-\log U_i)$ is a standard Gumbel distribution with $U_i$ sampled from a uniform i.i.d. (independent and identically distributed) distribution $\text{Unif}(0, 1)$. Due to the non-differentiable property of the arg max operation in Equation 6, the Gumbel Softmax distribution is thus used as a continuous relaxation to arg max. Accordingly, sampling from a Gumbel Softmax distribution allows the backpropagation from the discrete samples to the policy network 404. Now, let P be a one hot vector $[\hat{P}_0, \ldots, \hat{P}_{L+M-1}]$:

$$\hat{P}_i = \begin{cases} 1, & \text{if } i = \hat{p} \\ 0, & \text{otherwise} \end{cases} \qquad (7)$$

The one-hot coding of vector $\hat{P}$ is relaxed to a real-valued vector P using softmax:

$$P_i = \frac{\exp((\log p_i + G_i)/\tau)}{\sum_{j=0}^{L+M-1} \exp((\log p_j + G_j)/\tau)}, i \in [0, \ldots, L+M-1] \qquad (8)$$

where $\tau$ is a temperature parameter, which controls the 'smoothness' of the distribution P, as $$\lim_{\tau \to +\infty}$$

P converges to a uniform distribution and $$\lim_{\tau \to 0}$$

P becomes a one-hot vector. $\tau = 5$ is set as the initial value and it is gradually annealed down to 0 during the training.

To summarize, during the forward pass, the decision policy is sampled using Equation 6 (this is equivalent to the process mentioned in Equation 3 and $\theta_{FC} = \theta_G$) and during the backward pass, the gradient of the discrete samples is approximated by computing the gradient of the continuous softmax relaxation in Equation 8.

Loss Functions

During training, the standard cross-entropy loss is used to measure the classification quality as:

$$\mathcal{L}_{acc} = \mathbb{E}_{(V,y) \sim \mathcal{D}_{train}} [-y \log(\mathcal{F}(V;\Theta))] \quad (9)$$

where $\Theta = \{\theta_\Phi, \theta_{LSTM}, \theta_G, \theta_{\psi_0}, \ldots, \theta_{\psi_{L-2}}\}$ and (V, y) is the training video sample with associated one-hot encoded label vector. The above loss only optimizes for accuracy without taking efficiency into account. To address computational efficiency, the giga-floating point operations per second (GFLOPS) is computed for each individual module (and specific resolution of frames) offline and a lookup table is formulated. The overall runtime GFLOPS for an exemplary network is estimated based on the online lookup table GFLOP $S_\mathcal{F} : \Omega \to \mathbb{R}^+$ and online policy $a_{V,t}$ for each training video $(V,y) \sim \mathcal{D}_{train}$. The GFLOPS per frame is used as a loss term to punish for high-computation operations, $$\mathcal{L}_{flops} = \mathbb{E}_{(V,y) \sim \mathcal{D}_{train}} \left[ \frac{1}{T} \sum_{t=0}^{T-1} FLOPS_\mathcal{F}(a_{V,t}) \right] \quad (10)$$

Furthermore, to encourage the policy learning to choose more frames for skipping, an additional regularization term is added to enforce a balanced policy usage, $$\mathcal{L}_{uni} = \sum_{i=0}^{L+M-1} \left( \mathbb{E}_{(V,y) \sim \mathcal{D}_{train}} \left[ \frac{1}{2} \sum_{t=0}^{T-1} \mathbb{I}(\alpha_{V,t} = i) \right] - \frac{1}{L+M} \right)^2 \quad (11)$$

where $\mathbb{I}(\cdot)$ is the indicator function. Here, $$\mathbb{E}_{(V,y) \sim \mathcal{D}_{train}} \left[ \frac{1}{T} \sum_{t=0}^{T-1} \mathbb{I}(a_{V,t} = i) \right]$$

represents the frequency of action i being made through the dataset. Intuitively, this loss function term drives the network to balance the policy usage in order to obtain a high entropy for the action distribution. To sum up, the final loss function for the training becomes:

$$\mathcal{L} = (1-\alpha) \cdot \mathcal{L}_{acc} + \alpha \cdot \mathcal{L}_{flops} + \beta \cdot \mathcal{L}_{uni} \quad (12)$$

where $\alpha$ denotes respective loss weight for the computing efficiency, and $\beta$ controls the weight for the regularization term.

In one example experimental set-up, the training process is divided into 3 stages: warm-up, joint-training and fine-tuning. For warm-up, the policy network 404 is fixed and the backbones network are only trained (e.g., pretrained) for 10 epochs with learning rate 0.02. Then, the whole pipeline is jointly trained for 50 epochs with learning rate 0.001. After that, the policy network 404 parameters are fixed and the backbones networks are fine-tuned for 50 epochs with a lower learning rate of 0.0005. The initial temperature r is set to 5, and it is gradually annealed with an exponential decay factor of −0.045 in every epoch.

Figure 4C:
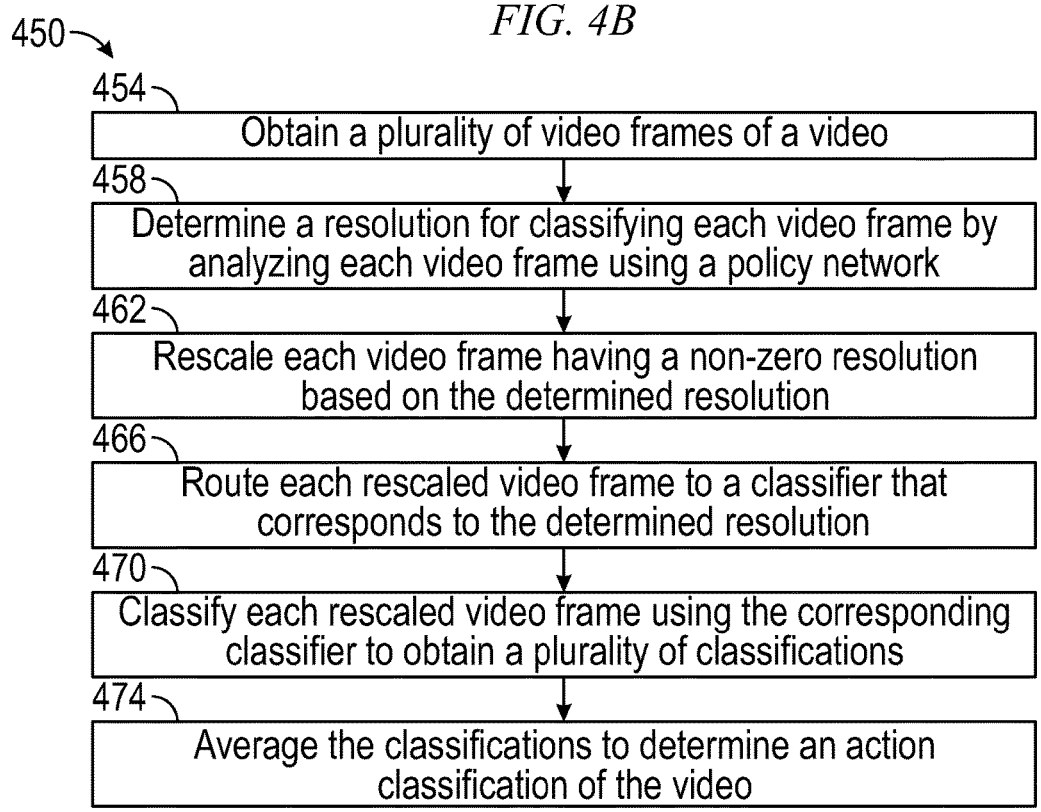
FIG. 4C is an example method for classifying videos, in accordance with an example embodiment.

FIG. 4C is an example method 450 for classifying videos, in accordance with an example embodiment. In one example embodiment, a plurality of video frames 304-1, 304-2, . . . , 304-N of a video are obtained (operation 454). A resolution for classifying each video frame 304-1, 304-2, . . . , 304-N of the plurality of video frames 304-1, 304-2, . . . , 304-N is determined by analyzing each video frame 304-1, 304-2, . . . , 304-N using a policy network 404 (operation 458). Each video frame having a determined resolution is rescaled based on the determined resolution (operation 462) and each rescaled video frame is routed to a classifier of a backbone network 412-1, 412-2, . . . , 412-N that corresponds to the determined resolution (operation 466). Each rescaled video frame is classified using the corresponding classifier of the backbone network 412-1, 412-2, . . . , 412-N to obtain a plurality of classifications (operation 470). The classifications are averaged to determine an action classification of the video (operation 474). Regarding each frame having a determined resolution being rescaled, it may be helpful in some instances to think of each frame having a non-zero determined resolution being rescaled, since, if the frame is skipped, then there is no need to rescale it. However, since the policy network used in one or more embodiments can also predict "skip" as a decision for a given frame, the phrase "non-zero" can be omitted since skipping a frame is essentially equivalent to zero resolution for a frame.

Given the discussion thus far, it will be appreciated that, in general terms, an exemplary method, according to an aspect of the invention, includes the operations of obtaining a plurality of video frames 304-1, 304-2, . . . , 304-N of a video (operation 454); determining a resolution for classifying each video frame 304-1, 304-2, . . . , 304-N of the plurality of video frames 304-1, 304-2, . . . , 304-N by analyzing each video frame 304-1, 304-2, . . . , 304-N using a policy network 404 (operation 458); rescaling, based on the determined resolution, each video frame 304-1, 304-2, . . . , 304-N having a determined resolution (operation 462); routing each rescaled video frame to a classifier of a backbone network 412-1, 412-2, . . . , 412-N that corresponds to the determined resolution (operation 466); classifying each rescaled video frame using the corresponding classifier of the backbone network 412-1, 412-2, . . . , 412-N to obtain a plurality of classifications (operation 470); and averaging the classifications to determine an action classification of the video (operation 474).

In one aspect, a non-transitory computer readable medium comprises computer executable instructions which when executed by a computer cause the computer to perform the method of obtaining a plurality of video frames 304-1, 304-2, . . . , 304-N of a video (operation 454); determining a resolution for classifying each video frame 304-1, 304-2, . . . , 304-N of the plurality of video frames 304-1, 304-2, . . . , 304-N by analyzing each video frame 304-1, 304-2, . . . , 304-N using a policy network 404 (operation 458); rescaling, based on the determined resolution, each video frame 304-1, 304-2, . . . , 304-N having a determined resolution (operation 462); routing each rescaled video frame to a classifier of a backbone network 412-1, 412-2, . . . , 412-N that corresponds to the determined resolution (operation 466); classifying each rescaled video frame using the corresponding classifier of the backbone network 412-1, 412-2, . . . , 412-N to obtain a plurality of classifications (operation 470); and averaging the classifications to determine an action classification of the video (operation 474).

In one aspect, an apparatus comprises a memory; and at least one processor, coupled to said memory, and operative to perform operations comprising obtaining a plurality of video frames 304-1, 304-2, . . . , 304-N of a video (operation 454); determining a resolution for classifying each video frame 304-1, 304-2, . . . , 304-N of the plurality of video frames 304-1, 304-2, . . . , 304-N by analyzing each video frame 304-1, 304-2, . . . , 304-N using a policy network 404 (operation 458); rescaling, based on the determined resolution, each video frame 304-1, 304-2, . . . , 304-N having a determined resolution (operation 462); routing each rescaled video frame to a classifier of a backbone network 412-1, 412-2, ..., 412-N that corresponds to the determined resolution (operation 466); classifying each rescaled video frame using the corresponding classifier of the backbone network 412-1, 412-2, ..., 412-N to obtain a plurality of classifications (operation 470); and averaging the classifications to determine an action classification of the video (operation 474).

In one example embodiment, the policy network 414 and a recognition model of the backbone network 412-1, 412-2, ..., 412-N are jointly trained using standard backpropagation. In one example embodiment, policies from a Gumbel Softmax distribution are sampled, enabling optimization of the policy network 404 via the standard backpropagation and the policy network can be optimized based on the sampled policies (in one or more embodiments, the policy network is optimized jointly with the other steps/operations).

In one example embodiment, the policy network 404 contains a lightweight feature extractor and a long short-term memory (LSTM) module that performs the determination of the resolution. In one example embodiment, given a hidden state, the policy network 404 estimates a policy distribution and samples an action at $a_t \in \Omega = \{0, 1, \ldots L+M-1\}$ via a Gumbel Softmax operation:

$$a_t \sim \text{GUMBEL}(h_t, \theta_G)$$

wherein, if $a_t < L$, the video frame is rescaled to spatial resolution $3 \times H_{a_t} \times W_{a_t}$ and forwarded to the corresponding backbone network 412-1, 412-2, ..., $$412\text{-}N\ \psi_{a_t}(\cdot\,;\theta_{\psi_{a_t}})$$

to get a frame-level prediction, $y_t^{a_t} = \psi_{a_t}(I_t^{a_t};$ $$y_t^{a_t} = \psi_{a_t}(I_t^{a_t};\theta_{\psi_{a_t}})$$

wherein $$I_t^{a_t} \in \mathbb{R}^{3 \times H_{a_t} \times W_{a_t}}$$

is the rescaled video frame and $y_t^{a_t} \in \mathbb{R}^C$ is the frame-level prediction; and wherein, if the action $a_t \geq L$, the video frame is skipped for prediction and a subsequent $(F_{a_t-L}-1)$ frames are skipped by the policy network 404, wherein $a_t$ represents an action at time t, L is a number of resolutions, M is a number of frames in a skipping sequence, $(H_x, W_x)$ is a frame resolution, $h_t$ is a hidden state, and $\theta_G$ denotes learnable parameters, and $\psi_{a_t}(\bullet;$ $$\psi_{a_t}(\cdot\,;\theta_{\psi_{a_t}})$$

is a corresponding backbone network 412-1, 412-2, ..., 412-N.

In one example embodiment, a differentiable sample from a corresponding Gumbel-Softmax distribution is substituted for an original non-differentiable sample from a discrete distribution. In one example embodiment, at each time step t, a logits $z \in \mathbb{R}_{L+M-1}$ is generated from hidden states $h_t$ by a fully-connected layer $z = FC(h_t, \theta_{FC})$ and using a Softmax to generate a categorical distribution $\pi_t$, $$\pi_t = \left\{ p_i \mid p_i = \frac{\exp(z_i)}{\sum_{j=0}^{L+M-1} \exp(z_j)} \right\}$$

In one example embodiment, discrete samples from a categorical distribution are drawn as follows:

$$\hat{p} = \arg\max_i (\log p_i + G_i)$$

where $G_i = -\log(-\log U_i)$ is a standard Gumbel distribution with $U_i$ sampled from a uniform i.i.d. distribution Unif(0, 1).

In one example embodiment, during a backward pass, a gradient of the discrete samples is approximated by computing a gradient of a continuous softmax relaxation. In one example embodiment, a classification quality is measured, during training, using a standard cross-entropy loss based on:

$$\mathcal{L}_{acc} = \mathbb{E}_{(V,y)\sim\mathcal{D}_{train}}[-y\log(\mathcal{F}(V;\Theta))]$$

where $\Theta = \{\theta_\Phi, \theta_{LSTM}, \theta_G, \theta_{\psi_0}, \ldots, \theta_{\psi_{L-2}}\}$ and (V; y) is a training video sample with an associated one-hot encoded label vector, wherein V is a video and $\mathcal{F}$ is a classifier. In one example embodiment, a prediction for a video frame having a lowest resolution is only processed once by a neural network.

Figure 5:
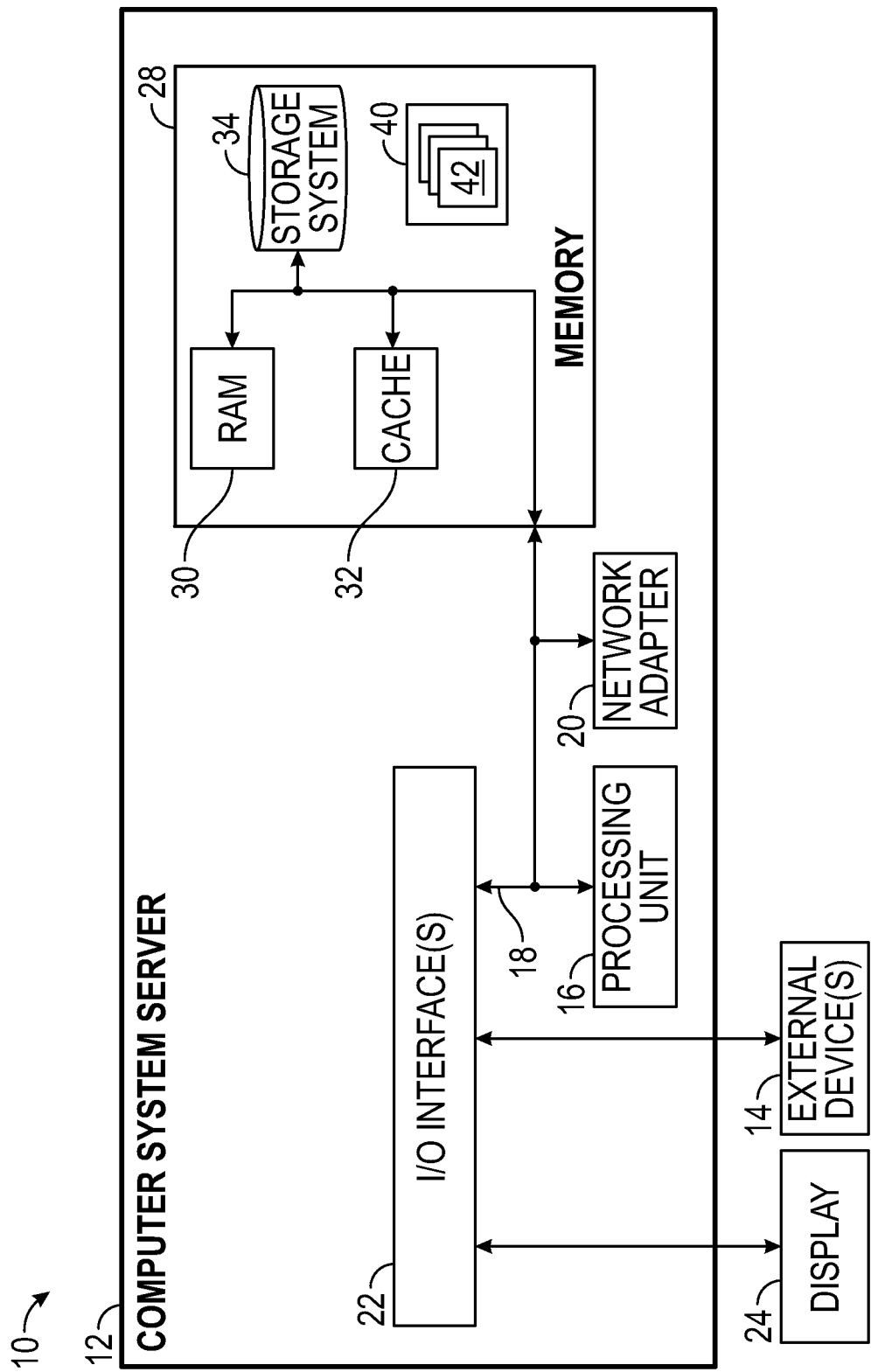
FIG. 5 depicts a computer system that may be useful in implementing one or more aspects and/or elements of the invention, also representative of a cloud computing node according to an embodiment of the present invention.

One or more embodiments of the invention, or elements thereof, can be implemented in the form of an apparatus including a memory and at least one processor that is coupled to the memory and operative to perform exemplary method steps. FIG. 5 depicts a computer system that may be useful in implementing one or more aspects and/or elements of the invention, also representative of a cloud computing node according to an embodiment of the present invention. Referring now to FIG. 5, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 5, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 5) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
  obtaining a plurality of video frames of a video;
  determining a resolution targeted for action classification for classifying each video frame of the plurality of video frames by analyzing each video frame using a policy network, wherein the policy network has a feature extractor and is trained to determine the resolution targeted to action classification;
  rescaling, based on the determined resolution targeted for action classification, each video frame;
  routing each rescaled video frame to a classifier of a backbone network, wherein the classifier routed to corresponds to the determined resolution;
  classifying each rescaled video frame using the corresponding classifier of the backbone network to obtain a plurality of classifications; and
  averaging the classifications to determine an action classification of the video.

2. The method of claim 1, further comprising jointly training the policy network and a recognition model of the backbone network using standard backpropagation.

3. The method of claim 2, further comprising:
  sampling policies from a Gumbel Softmax distribution, enabling optimization of the policy network via the standard backpropagation; and
  optimizing the policy network based on the sampled policies.

4. The method of claim 1, wherein the policy network contains a long short-term memory (LSTM) module that performs the determination of the resolution.

5. The method of claim 1, wherein given a hidden state, the policy network estimates a policy distribution and samples an action at $a_t \in \Omega = \{0, 1, \ldots L+M-1\}$ via a Gumbel Softmax operation:

$$a_t\text{-GUMBEL}(h_t, \theta_G)$$

wherein, when $a_t < L$, the video frame is rescaled to spatial resolution $3 \times H_{a_t} \times W_{a_t}$ and forwarded to the corresponding backbone network $\psi_{a_t}(\bullet; \theta_{\psi_{a_t}})$ to get a frame-level prediction, $$y_t^{a_t} = \psi_{a_t}(I_t^{a_t}; \theta_{\psi_{a_t}})$$

wherein $$I_t^{a_t} \in \mathbb{R}^{3 \times H_{a_t} \times W_{a_t}}$$

is the rescaled video frame and $y_t^{a_t} \in \mathbb{R}^C$ is the frame-level prediction; and wherein, when the action $a_t \geq L$, the video frame is skipped for prediction and a subsequent ($F_{a_t-L}-1$) frames are skipped by the policy network, wherein $a_t$ represents an action $a_t$ time t, L is a number of resolutions, M is a number of frames in a skipping sequence, $(H_x, W_x)$ is a frame resolution, $h_t$ is a hidden state, and $\theta_G$ denotes learnable parameters, and $\psi_{a_t}(\bullet; \theta_{\psi_{a_t}})$ is a corresponding backbone network.

6. The method of claim 1, further comprising substituting a differentiable sample from a corresponding Gumbel-Softmax distribution for an original non-differentiable sample from a discrete distribution.

7. The method of claim 6, further comprising generating, $a_t$ each time step t, a logits $z \in \mathbb{R}^{L+M-1}$ from hidden states $h_t$ by a fully-connected layer $z = FC(h_t, \theta_{FC})$ and using a Softmax to generate a categorical distribution $\pi_t$, $$\pi_t = \left\{ p_i \mid p_i = \frac{\exp(z_i)}{\sum_{j=0}^{L+M-1} \exp(z_j)} \right\}$$

wherein discrete samples from a categorical distribution are drawn as follows:

$$\hat{p} = \arg\max_i (\log p_i + G_i)$$

where $G_i = -\log(-\log U_i)$ is a standard Gumbel distribution with $U_i$ sampled from a uniform i.i.d. distribution Unif(0, 1).

8. The method of claim 7, further comprising approximating, during a backward pass, a gradient of the discrete samples by computing a gradient of a continuous softmax relaxation.

9. The method of claim 1, further comprising measuring a classification quality, during training, using a standard cross-entropy loss based on:

$$\mathcal{L}_{acc} = \mathbb{E}_{(V,y) \sim \mathcal{D}_{train}} [-y \log(\mathcal{F}(V; \Theta))]$$

where $\Theta = \{\theta_\Phi, \theta_{LSTM}, \theta_G, \theta_{\psi_{L-2}}\}$ and (V; y) is a training video sample with an associated one-hot encoded label vector, wherein V is a video and $\mathcal{F}$ is a classifier.

10. The method of claim 1, wherein a prediction for a video frame having a lowest resolution is only processed once by the policy network.

11. A non-transitory computer readable medium comprising computer executable instructions which when executed by a computer cause the computer to perform the method of:

obtaining a plurality of video frames of a video;
determining a resolution targeted for action classification for classifying each video frame of the plurality of video frames by analyzing each video frame using a policy network, wherein the policy network has a feature extractor and is trained to determine the resolution targeted to action classification;
rescaling, based on the determined resolution, each video frame;
routing each rescaled video frame to a classifier of a backbone network, wherein the classifier routed to corresponds to the determined resolution;
classifying each rescaled video frame using the corresponding classifier of the backbone network to obtain a plurality of classifications; and
averaging the classifications to determine an action classification of the video.

12. An apparatus comprising:
a memory; and
at least one processor, coupled to said memory, and operative to perform operations comprising:
obtaining a plurality of video frames of a video;
determining a resolution targeted for action classification for classifying each video frame of the plurality of video frames by analyzing each video frame using a policy network, wherein the policy network has a feature extractor and is trained to determine the resolution targeted to action classification;
rescaling, based on the determined resolution, each video frame;
routing each rescaled video frame to a classifier of a backbone network, wherein the classifier routed to corresponds to the determined resolution;
classifying each rescaled video frame using the corresponding classifier of the backbone network to obtain a plurality of classifications; and
averaging the classifications to determine an action classification of the video.

13. The apparatus of claim 12, the operations further comprising jointly training the policy network and a recognition model of the backbone network using standard backpropagation.

14. The apparatus of claim 13, the operations further comprising:
sampling policies from a Gumbel Softmax distribution, enabling optimization of the policy network via the standard backpropagation; and
optimizing the policy network based on the sampled policies.

15. The apparatus of claim 12, wherein the policy network contains a long short-term memory (LSTM) module that performs the determination of the resolution.

16. The apparatus of claim 12, wherein given a hidden state, the policy network estimates a policy distribution and samples an action at $a_t \in \Omega = \{0, 1, \ldots L+M-1\}$ via a Gumbel Softmax operation:

$$a_t \sim \text{GUMBEL}(h_t, \theta_G)$$

wherein, if $a_t < L$, the video frame is rescaled to spatial resolution $3 \times H_{a_t} \times W_{a_t}$ and forwarded to the corresponding backbone network $\psi_{a_t}(\cdot; \theta_{\psi_{a_t}})$ to get a frame-level prediction, $$y_t^{a_t} = \psi_{a_t}(I_t^{a_t}; \theta_{\psi_{a_t}})$$

wherein $$I_t^{a_t} \in \mathbb{R}^{3 \times H_{a_t} \times W_{a_t}}$$

is the rescaled video frame and $y_t^{a_t} \in \mathbb{R}^C$ is the frame-level prediction; and wherein, if the action $a_t >= L$, the video frame is skipped for prediction and a subsequent $(F_{a_t-L}-1)$ frames are skipped by the policy network, wherein $a_t$ represents an action at time t, L is a number of resolutions, M is a number of frames in a skipping sequence, $(H_x, W_x)$ is a frame resolution, $h_t$ is a hidden state, and $\theta_G$ denotes learnable parameters, and $\psi_{a_t}(\cdot; \theta_{\psi_{a_t}})$ is a corresponding backbone network.

17. The apparatus of claim 12, the operations further comprising substituting a differentiable sample from a corresponding Gumbel-Softmax distribution for an original non-differentiable sample from a discrete distribution.

18. The apparatus of claim 17, the operations further comprising generating, at each time step t, a logits $z \in \mathbb{R}^{L+M-1}$ from hidden states $h_t$ by a fully-connected layer $z = FC(h_t, \theta_{FC})$ and using a Softmax to generate a categorical distribution $\pi_t$, $$\pi_t = \left\{ p_i \mid p_i = \frac{\exp(z_i)}{\sum_{j=0}^{L+M-1} \exp(z_j)} \right\}$$

wherein discrete samples from a categorical distribution are drawn as follows:

$$\hat{p} = \arg\max_i(\log p_i + G_i)$$

where $G_i = -\log(-\log U_i)$ is a standard Gumbel distribution with $U_i$ sampled from a uniform i.i.d. distribution Unif(0, 1).

19. The apparatus of claim 18, the operations further comprising approximating, during a backward pass, a gradient of the discrete samples by computing a gradient of a continuous softmax relaxation.

20. The apparatus of claim 12, the operations further comprising measuring a classification quality, during training, using a standard cross-entropy loss based on:

$$\mathcal{L}_{acc} = \mathbb{E}_{(V,y) \sim \mathcal{D}_{train}} [-y \log(\mathcal{F}(V; \Theta))]$$

where $\Theta = \{\theta_\Phi, \theta_{LSTM}, \theta_G, \theta_{\psi_{L-2}}\}$ and (V; y) is a training video sample with an associated one-hot encoded label vector, wherein V is a video and $\mathcal{F}$ is a classifier.

21. The method of claim 1, wherein given a hidden state, the policy network estimates a policy distribution and samples an action at $a_t$ via a Gumbel Softmax operation, wherein, when $a_t < L$, the video frame is rescaled to a given spatial resolution and forwarded to the corresponding backbone network to get a frame-level prediction; and wherein, when the action $a_t \geq L$, the video frame and a subsequent set of frames are skipped by the policy network, wherein L is a number of resolutions.

* * * * *